United States Patent

Suzuki

[11] Patent Number: 5,357,315
[45] Date of Patent: Oct. 18, 1994

[54] METHOD OF DETERMINING EXPOSURE CONDITION

[75] Inventor: Kenji Suzuki, Kanagawa, Japan

[73] Assignee: Fuji Photo Film Co., Ltd., Kanagawa, Japan

[21] Appl. No.: 968,485

[22] Filed: Oct. 29, 1992

[30] Foreign Application Priority Data

Oct. 30, 1991 [JP] Japan ................................. 3-284893

[51] Int. Cl.$^5$ .............................................. G03B 27/80
[52] U.S. Cl. ........................................ 355/77; 355/38; 355/88
[58] Field of Search ............................ 355/77, 38, 88; 356/404, 405, 406, 407, 408

[56] References Cited

U.S. PATENT DOCUMENTS 4,942,424  8/1993  Terashita et al. ...................... 355/38

FOREIGN PATENT DOCUMENTS 1307737  12/1989  Japan .

Primary Examiner—Michael L. Gellner
Assistant Examiner—D. P. Malley
Attorney, Agent, or Firm—Sughrue, Mion, Zinn, Macpeak & Seas

[57] ABSTRACT

An exposure condition is determined with reference to a difference between a density value Dx of a negative film to be printed and a corrected density value DNi (i=x) of a reference film. The method comprises the steps of: measuring density values DNi of a plurality of types of reference films and light amounts Li of a light source at times of measurement of the density values DNi; storing the density values DNi and the light amounts Li as memorized density values and memorized light amounts corresponding to the respective reference films; measuring a current light amount L of a current light source which is used for exposure of the negative film to be printed; calculating a difference logL−logLi=δi between the light amount L and each of the memorized light amounts Li; correcting each of the memorized density values DNi by the use of the difference δi. An exposure condition for the negative film is accurately determined by substituting the density value Dx and the corrected density value DNi (i=x) into a predetermined formula for calculating an exposure condition for a negative film.

8 Claims, 3 Drawing Sheets

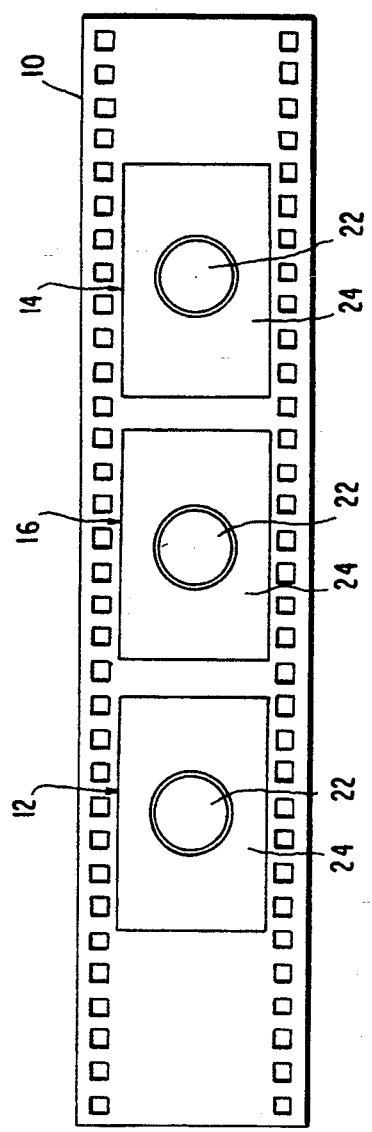
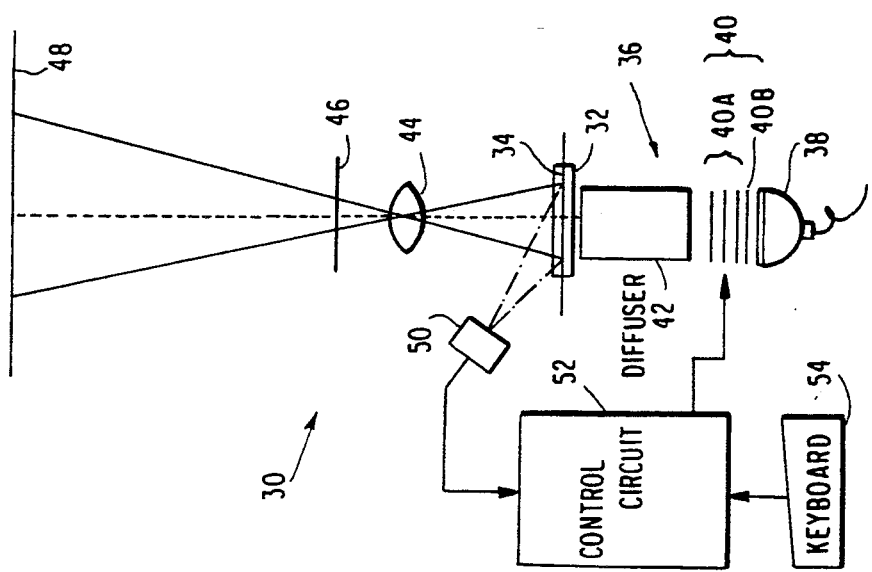
FIG. 2
FIG. 1

METHOD OF DETERMINING EXPOSURE CONDITION

BACKGROUND OF THE INVENTION (1) Field of the Invention

This invention relates to a method of determining an exposure condition which is corrected in accordance with variation of a light source.

(2) Description of the Invention

Generally, a printer of a photographic printing apparatus comprises a light source including a halogen lamp and the like an optical system including a CC filter and the like. Light emitted from the light source is transmitted through the optical system and irradiated onto a photographic paper after passing through a negative film. Thus, an image recorded on the negative film is printed on to the photographic paper. The optical system is controlled in accordance with a predetermined exposure condition. For example, the exposure condition is determined as follows. A so-called eye pattern negative is prepared as a reference film. A plurality of images for use in determining the exposure condition are recorded on the reference film. Each of the images comprises a central region corresponding to a gray-colored object and a surrounding region corresponding to an average object color. A density value of the reference film is preliminarily measured as a light amount of transmission light passing through the reference film and memorized as a reference density value. Next, a density value of a negative film to be printed is measured. A difference is calculated between the reference density value and the density value of the negative film to be printed. The exposure condition is determined in accordance with the difference thus calculated.

The printer is capable of performing a printing operation on a plurality of types of negative films. A plurality of types of reference films are prepared in correspondence to the types of negative films to be printed. In this connection, the printer is provided with a plurality of memory areas or channels in one-to-one correspondence to the types of the reference films. The density values of the reference films preliminarily measured are individually stored in the corresponding channels as the reference density values. The exposure condition is determined with reference to a corresponding one of the reference density values that is stored in a particular channel corresponding to the type of the negative film to be printed.

In the above-described printer, the light amount emitted from the light source often varys due to a change of the lamp in the light source, aging of the lamp, a change of a position of the lamp (change of a position of a filament), a change of a reflector behind the lamp, adjustment of the CC filter, a variation of a source voltage, and the like. The variation of the light amount emitted from the light source will hereinafter be referred to as light source variation. Upon occurrence of the light source variation, a relationship between a position of the filter and an amount of transmission light passing through the filter is changed. This results in unfavorable variation in measurement of the density values. It is therefore impossible to determine an accurate exposure condition when the light source variation occurs between the time of measurement of the reference density value and the time of measurement of the density value of the negative film to be printed.

In view of the above, the present inventor has already disclosed a light source variation correction method capable of obtaining an exposure condition from which the influence of light source variation is removed (see Japanese Patent Prepublication No. 307737/1989). in this light source variation correction method, a current density value Dx of a specific reference film is measured after the occurrence of the light source variation. An initial density value Di (i=x) is preliminarily measured and stored in a channel corresponding to the specific reference film. A difference $\delta i = Di(i=x) - Dx$ is calculated between the initial density value Di (i=x) and the current density value Dx. All initial density values Di (i=1 through n) preliminarily stored in the respective channels are renewed with reference to the difference or a correction value $\delta i$. With the reference film set in the printer, a calibration curve is prepared which represents a relationship between the position of the CC filter and the amount of transmission light. Thus, an exposure condition is obtained which is corrected in accordance with the light source variation.

In the meanwhile, it takes a long time to preliminarily measure the initial density values Di(i=1 through n) storing in the respective channels for a plurality of types of reference films. Accordingly, measurement of the initial density values for the plurality of types of reference films may often be carried out for several days. Before measurement is completed for all of the reference films, the light source variation is possibly caused by the aging of the light source. The changing of the light source, or the like. In this event, the initial density values Di measured under different conditions (namely, different light amounts of the light source) are stored in the respective channels. If the initial density values Di are uniformly corrected according to the above-mentioned conventional method by the use of the correction value $\delta i$ which is obtained under a particular light amount of the light source, the initial density values Di can not be properly corrected because they are measured under different conditions.

In the above-mentioned conventional method, measurement of the density values must be repeatedly carried out for the specific reference film each time light source variation occurs. Such repeated measurement of the reference film results in the fading of the reference film. Consequently, it is impossible to accurately compensate for the light source variation.

SUMMARY OF THE INVENTION

It is an object of the present invention to provide a method of determining an optimum exposure condition for a negative film by accurately correcting density values of a plurality of types of reference films with reference to a variation of a light amount of a light source between the time of printing the negative film and the time of measuring the density value of each reference film.

According to this invention, a method of determining an exposure condition for a negative film comprises the steps of: measuring a density value of a reference film and a light amount of a light source at the time of measurement of the density value of the reference film; storing the density value and the light amount as a stored density value and a stored light amount, respectively; measuring a current light amount of a light source which is used for exposure of a negative film to be printed; calculating a difference between the current light amount and the stored light amount; correcting the stored density value of the reference film into a corrected density value with reference to the difference; measuring, a density value of the negative film to be printed under the current light amount; and calculating an exposure condition for the negative film by the use of a density difference between the corrected density value and the density value of the negative film.

According to an aspect of this invention, a method of determining an exposure condition for a negative film comprises the steps of: measuring density values $DN_i$ of a plurality of types of reference films and light amounts $L_i$ of a light source at the times of measurement of the density values $DN_i$; storing the density values $DN_i$ and the light amounts $L_i$ as stored density values and stored light amounts corresponding to the respective reference films; measuring a current light amount L of a current light source which is used for exposure of the negative film to be printed; calculating a difference $\delta_i = \log L - \log L_i$ between the light amount L and each of the stored light amounts $L_i$; correcting each of the stored density values $DN_i$ by the use of the difference $\delta_i$; measuring a particular density value $D_x$ of the negative film to be printed; and calculating an exposure condition for the negative film to be printed with reference to a density difference between the particular density value $D_x$ and the corrected density value $DN_i$ ($i=x$) of a corresponding one of the reference films that corresponds to the type of the negative film to be printed.

The density values $DN_i$ of the reference films, the light amounts $L_i$, and the particular density value $D_x$ of the negative film to be printed are generally measured for each of three primary colors R (red), G (green), and B (blue). The reference films preferably include three types of negative films, namely, under-exposure, normal-exposure, and over-exposure negatives.

According to this invention, the density value of the reference film is preliminarily measured and stored as the stored density value. Simultaneously, the light amount of the light source at the time of measurement of the density value is preliminarily measured and stored as the stored light amount. Then, on determination of an exposure condition for the negative film to be printed, the current light amount of the light source is measured. Based on the difference between the current light amount and the memorized light amount, the memorized density value of the reference film is corrected. Even if light source variation occurs during measurement of a plurality of types of reference films so that the density values of the reference films are measured under different light amounts, variation of the light amount of the light source is accurately compensated for with respect to each of the reference films. This is because the memorized density values are corrected with reference to the light amounts at the times of measurement of the memorized density values. As a result, a proper exposure condition is obtained for any type of the negative

BRIEF DESCRIPTION OF THE DRAWING

FIG. 1 is a schematic diagram of a printer to which the present invention is applicable;

FIG. 2 is a plan view of a reference film;

DETAILED DESCRIPTION OF THE INVENTION

Figure 3:
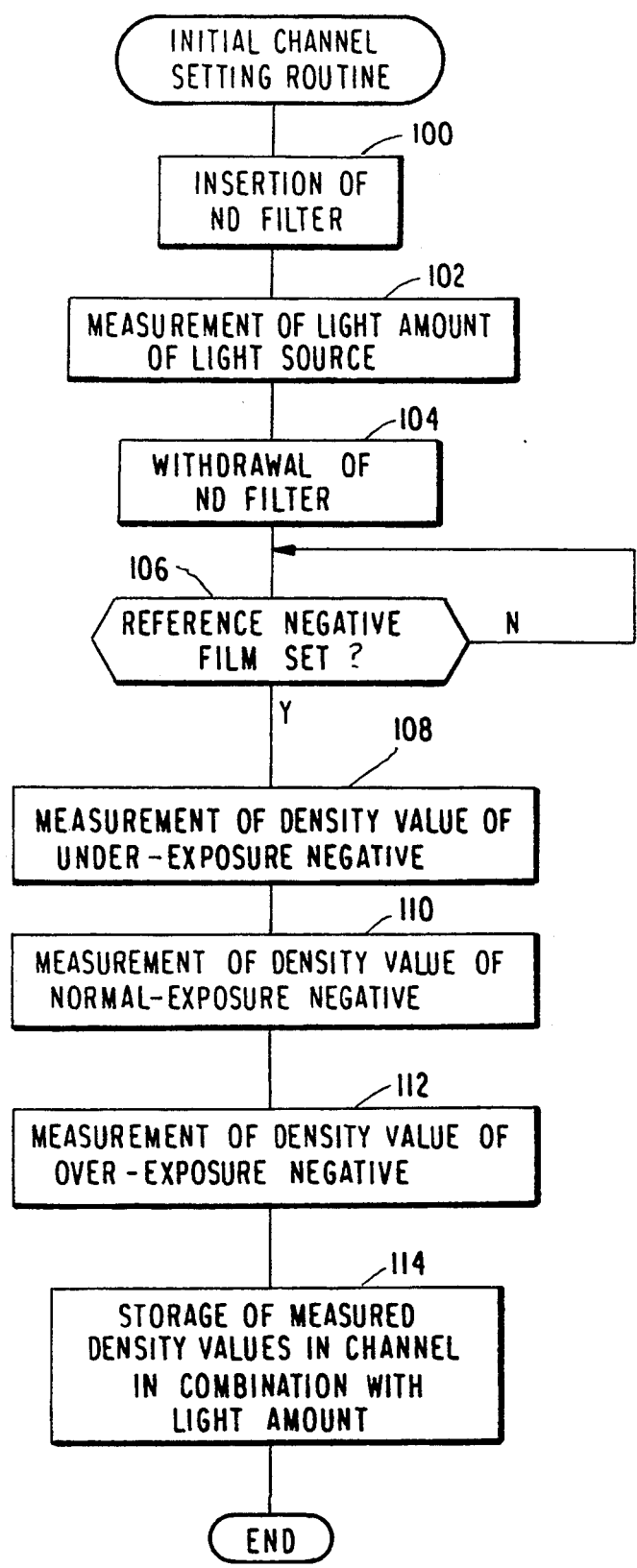
FIG. 3 is a flow chart for describing an initial channel setting operation according to an embodiment of this invention.

A description will now be made of an embodiment of the present invention with reference to the drawings.

FIG. 1 shows a printer 30 to which a method of determining an exposure condition according to the invention is applicable.

The printer 30 comprises a negative carrier 32 for carrying a developed negative film 34 and a reference film which will be described later. The negative carrier 32 is for successively locating each image frame recorded on the negative film 34 at an exposure position.

Referring to FIG. 2, a reference film 10 to be mounted on the negative carrier 32 includes an under-exposure color negative image 12, an over-exposure color negative image 14, and a normal-exposure color negative image 16 which are developed by exposure under predetermined conditions. Each of the negative images comprises a gray region 22 corresponding to a gray-colored object and an average object region 24 corresponding to an average object and surrounding the gray region 22. The printer 30 is adapted to accept a plurality of types of the negative films 34. A plurality of types of reference films 10 is prepared in correspondence to the types of the negative films. An ultra-over-exposure color negative image may be prepared in addition to the above-mentioned three negative images 12, 14, and 16.

Turning back to FIG. 1, a light source 36 is arranged below the negative carrier 32 of the printer 30. At the lowermost portion of the light source 36, a lamphouse 38 is arranged. The lamphouse 38 comprises a halogen lamp and a reflector for upwardly reflecting light emitted from the halogen lamp. Above the lamphouse 38, a light adjustment filter 40 comprising a CC filter group 40A and a cut filter (ND filter) 40B, and a light diffusion box 42 are successively arranged. The CC filter group 40A consists of a C (cyan) filter, an M (magenta) filter, and a Y (yellow) filter.

Above the negative carrier 32, a lens 44, a black shutter 46, and a color paper 48 are successively arranged to form an image-forming optical system. The arrangement is such that a light beam emitted from the lamphouse 38 passes through the light adjustment filter 40 and the light diffusion box 42 and is focused by the lens 44 to form an image on the color paper 48. At a position offset from an optical axis of the above-mentioned image-forming optical system and above the negative carrier 32, a photosensor 50 is arranged which is for measuring, as a density value, a light amount passing through an image frame in the negative film mounted on the negative carrier 32 by dividing the image frame into a plurality of sections. When the negative film 34 is not mounted on the negative carrier 32, the photosensor 50 operates to measure a light amount of the light beam emitted from the lamphouse 38 that passes through the light adjustment filter 40 and the light diffusion box 42.

The photosensor 50 is connected to a control circuit 52 which is supplied with data through a keyboard 54. The control circuit 52 comprises a memory having a plurality of channels for individually storing density values of a plurality of types of reference films as memorized density values. The control circuit 2 determines an exposure condition in accordance with the density value of the image frame to be exposed and the memorized density value stored in the corresponding channel. The control circuit 52 controls positions of the respective filters in the light adjustment filter 40 so that the actual exposure condition for the color paper 48 is coincident with the predetermined exposure condition.

Figure 4:
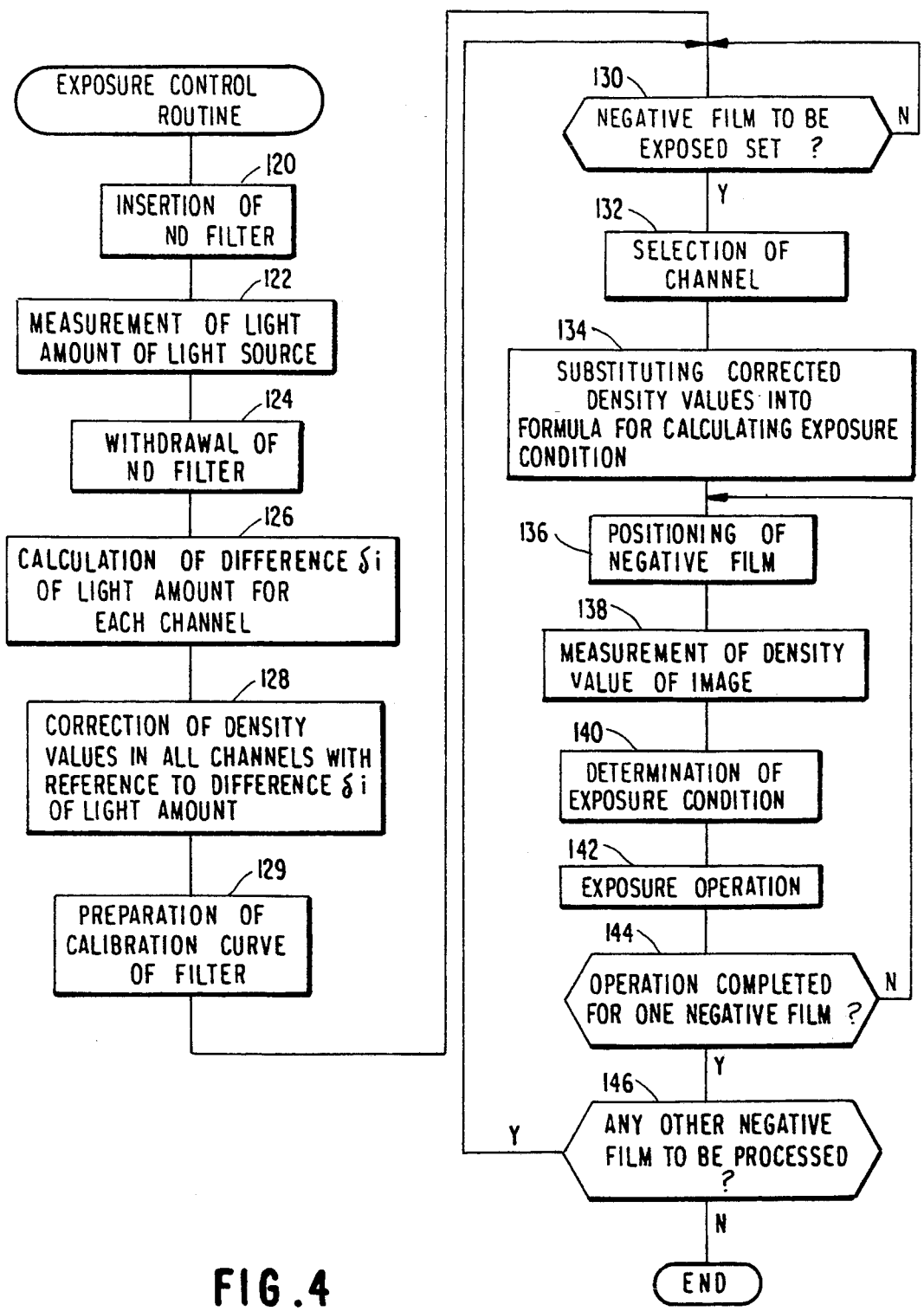
FIG. 4 is a flow chart for describing an exposure control operation according to the embodiment of this invention.

Description will now be made of an embodiment of the present invention with reference to flow charts illustrated in FIGS. 3 and 4. At first referring to FIG. 3, a description will be made of an initial channel setting operation. The operation illustrated in FIG. 3 is carried out for every type of reference film 10 upon installation of the printer 30.

In Step 100, the ND filter 40B is inserted in an optical path of the light beam emitted from the lamphouse 38 without setting the reference film 10 and the negative film 34 on the negative carrier 32 as shown in FIG. 1. In Step 102, the photosensor 50 measures a light amount Li of the light beam emitted from the lamphouse 38 after passing through the ND filter 40B for each of three primary colors R (red), G (green), and B (blue). Herein, i ($i=1,2,\ldots,n$) represents the number assigned to each of first through n-th channels. The light beam incident to the photosensor 50 is attenuated by the ND filter 40B so that the output of the photosensor 50 is never saturated. In Step 104, the ND filter 40B is withdrawn from the optical path.

In Step 106, judgment is made about whether or not the reference film 10 to be subjected to density measurement is set on the negative carrier 32. The judgment in Step 106 is repeated until the reference film 10 is set. Where upon the photosensor 50 measures a density value DNui of the under-exposure color negative image 12 on the reference film 10 for each of the three primary colors R, G, and B in Step 108.

Likewise, measurement is carried out of a density value DNni of the normal-exposure color negative image 16 on the reference film 10 for each of R, G, and B in Step 110. In Step 112, measurement is carried out of a density value DNoi of the over-exposure color negative image 14 for each of R, G, and B. In Step 114, the density values DNui, DNni, and DNoi are stored in the channels corresponding to the type of the reference film 10 in combination with the light amount Li measured in Step 102. Thus, the initial channel setting operation is completed.

The above-mentioned initial channel setting operation is repeatedly carried out for a plurality of types of the reference films 10. Finally, the density values of the reference films 10 are stored as memorized density values in the respective channels in combination with the light amounts of the lamphouse 38 at the times of measurement of the density values. Thus, the data relating to the respective reference films 10 are stored as shown in Table 1. It is assumed here that the initial channel setting operation for a plurality of types of reference films 10 are carried out for several days and the light amount of the lamphouse 38 is varied during this time. In this event, different light amounts L1, L2, ..., Ln are stored in the respective channels.

TABLE 1

| Channel No. | Light Amount | Density Value |
|---|---|---|
| 1 | L1 | DNu1, DNn1, DNo1 |
| 2 | L2 | DNu2, DNn2, DNo2 |
| 3 | L3 | DNu3, DNn3, DNo3 |
| . | . | . |
| . | . | . |
| n | Ln | DNun, DNnn, DNon |

Next referring to FIG. 4, an exposure control routine according to the embodiment of the present invention will be described. The exposure control routine is carried out when the image recorded on the negative film 34 is printed on the color paper 48. Similar to Steps 100 through 104, in steps 120 through 124 the ND filter 40B is inserted in to the optical path, the photosensor 50 measures the light amount L of the light beam emitted from the lamphouse 38 after passing through the ND filter 40B for each of R, G, and B, whereafter the ND filter 40B is withdrawn.

In Step 126, with reference to the light amount Li stored in each channel, the variation $\delta i$ of the light amount of the lamphouse 38 between the time of density measurement of the reference film 10 and the time of current printing is calculated by the following formula (1) for each channel:

$$\iota i = \log L - \log Li \qquad (1)$$

wherein L represents the light amount of the lamphouse 38 at the time of printing while Li represents the light amount of the lamphouse 38 at the time of density measurement of the reference film 10.

In Step 128, the memorized density values DNui, DNni, and DNoi in all channels are corrected by the use of the above-mentioned variations $\delta i$ of the light amount in accordance with the following formula (2). The corrected density values DNui, DNni, and DNoi are stored in the respective channels.

$$DNui = DNui + \delta i$$

$$DNni = DNni + \delta i \qquad (2)$$

$$DNoi = DNoi + \delta i$$

In Step 129, each filter of the CC filter group 40A of the light adjustment filter 40 is shifted stepwise by a microscopic amount along a direction intersecting with the optical axis. Simultaneously, the photosensor 50 measures the light amount passing through the light adjustment filter 40 and the light diffusion box 42. Thus, a filter calibration curve is prepared which is representative of variation of the light amount versus the shifting amount of the CC filter. The filter calibration curve is stored in the memory of the control circuit 52.

In Step 130 and the subsequent steps, an exposure operation is carried out. In Step 130, judgment is made about whether or not the negative film 34 to be exposed is set. If the judgment is affirmative in Step 130, the channel corresponding to the type of the negative film 34 is selected in Step 132.

In this embodiment, the exposure condition is determined by calculating an exposure control value Ej in accordance with the following formula (3):

$$\log Ej = CSj \times CCj \times (Dj - DNj) + \\ \alpha 1 \times KD + \alpha 2 \times KA + \\ \alpha 3 \times KCj + Cj, \qquad (3)$$

wherein represents an integer selected from 1 through 3 dependent upon R, G, and B; CSj represents a color slope control value (difference between over-exposure and under-exposure); CCj represents a color correction value; Dj represents a density value of an image on a negative film to be printed (for example, an average density of a whole picture surface); DNj represents an average density of a normal-exposure color negative image on a reference film; α1 represents a density key value; KD represents a step width of a density key; α2 represents a density correction amount; KA represents a step width of a density key; α3 represents a color key value; KCj represents a step width of a color key; Cj represents a constant dependent upon characteristics of the printer, the film, and the color paper. In Step 134, the above-mentioned corrected density values DNui, DNni, and DNoi stored in the channel selected in Step 132 are substituted into the formula (3).

In Step 136, the image to be printed is located at the exposure position by the negative carrier 32. In Step 138, the photosensor 50 measures the density value of the image located at the exposure position for each of R, G, and B. In Step 140, the density value measured in Step 138 and predetermined parameters are substituted in the formula (3) to determine the exposure condition. Since the memorized density values DNu1, DNn1, and DNo1 are corrected with reference to the variations δi of the light amount after the measurement of the lamphouse 38 as described above, the proper exposure condition is obtained with the variation of the light amount accurately compensated.

In Step 142, the light adjustment filter 40 is controlled in accordance with the calibration curve so that the actual exposure condition for the color paper 48 is coincident with the exposure condition calculated in the above-mentioned manner. The image located at the exposure position is exposed and printed on the color paper 48. In Step 144, judgement is made as regards whether or not the exposure operation for one negative film 32 is completed. If the judgement is not affirmative in Step 144, the operation returns to Step 136 to repeat the exposure operation in the similar manner.

If the judgement is affirmative in Step 144, the operation proceeds to Step 146 in which judgement is made about whether or not other negative film is to be exposed. If the judgement is affirmative in Step 146, the operation returns to Step 130 and the other negative film 34 to be exposed is set. In the similar manner as mentioned above, the channel corresponding to the type of the negative film 34 is selected. The parameters are calculated in accordance with the memorized density value stored in the selected channel. By the use of the parameters and the density value of each image, the exposure condition for each image is calculated. Then, the exposure operation is carried out.

The memorized density values DNui, DNni, and DNoi used herein are also corrected in Step 128 with reference to the variations δi of the light amount after the measurement of the lamphouse 38. Accordingly, the exposure operation is carried out under the proper exposure condition with the variation of the light amount after the density measurement of the reference film 10 is accurately compensated for. If the judgement is not affirmative in Step 146, the exposure control routine is finished.

As described above, according to the present invention, the density value of the reference film and the light amount of the light source at the time of measurement of the density value are preliminarily measured and stored as the memorized density value and the memorized light amount. When the exposure condition is determined, the light amount of the light source is again measured. The memorized density value of the reference film is corrected in accordance with the difference between the memorized light amount preliminarily stored and the light amount currently measured. As a result, it is possible to accurately compensate for the variation of the light amount of the light source.

Although this invention has been described in conjunction with a specific embodiment thereof, it is possible for those skilled in the art to put this invention into practice in various other manners. For example, various steps in the method can be performed in any appropriate order other than that described in conjunction with the specific embodiment. It is noted that the scope of this invention is described in the appended claims and is not restricted by the embodiment described in the specification. Any modification and variation within the range equivalent to the scope of the claims fall within the scope of this invention.

What is claimed is:

1. A method of determining an exposure condition for a negative film, comprising the steps of:

measuring a density value of a reference film and a light amount of a light source at a time of measuring of said density value of said reference film;

storing said density value and said light amount as a stored density value and a stored light amount, respectively;

measuring a current light amount of a light source used when exposing a negative film to be printed;

calculating a difference between said current light amount and said stored light amount;

correcting said stored density value of said reference film according to said difference;

measuring, a density value of said negative film to be printed under said current light amount; and calculating an exposure condition for said negative film by the use of a density difference between said corrected density value and said density value of said negative film.

2. A method of determining an exposure condition as claimed in claim 1, wherein said density values of said reference films, said light amounts, and said density value of said negative film to be printed are measured for each of three primary colors R (red), G (green), and B (blue).

3. A method of determining an exposure condition as claimed in claim 1, wherein said reference films include three types of reference films, namely, under-exposure, normal-exposure, and over-exposure negatives.

4. A method of determining an exposure condition for a negative film, comprising the steps of:

measuring density values DNi of a plurality of types of reference films and light amounts Li of a light source at the times of measurement of said density values DNi;

storing said density values DNi and said light amounts Li as stored density values and stored light amounts corresponding to said respective reference films;

measuring a current light amount L of a light source used when exposing the negative film to be printed;

calculating a difference $\log L - \log Li = \delta i$ between said light amount L and each of said stored light amounts Li;

correcting each of said stored density values DNi by using said difference δi;

measuring a density value Dx of said negative film to be printed under said light amount L; and calculating an exposure condition for said negative film to be printed with reference to a density difference between said density value Dx and said corrected density value DNi (i=x) of a corresponding one of said reference films that corresponds to the type of said negative film to be printed.

5. A method of determining an exposure condition as claimed in claim 4, wherein said density values DNi of said reference films, said light amounts Li, and said density value Dx of said negative film to be printed are measured for each of three primary colors R (red), G (green), and B (blue).

6. A method of determining an exposure condition as claimed in claim 4, wherein said reference films include three types of reference films, namely, under-exposure, normal-exposure, and over-exposure negatives.

7. A method of determining an exposure condition for a negative film, comprising the steps of:

measuring a light amount Li of transmission light emitted from a light source and passing through a negative carrier without setting a reference film and a negative film on said negative carrier, setting a reference film on said negative carrier; measuring density values DNui, DNni, and DNoi under said light amount Li for under-exposure, normal-exposure, and over-exposure negative images recorded on said reference film, and repeating the above-mentioned operation for a plurality of types of the reference films;

storing said density values DNui, DNni, and DNoi for a plurality of types of reference films in a plurality of channels corresponding to said reference films in combination with said light amounts Li at times of measurement of said density values;

measuring, when a negative film of a particular type is printed, a current light amount L of transmission light emitted from said light source and passing through said negative carrier without setting said negative film on said negative carrier;

calculating differences $\delta i = \log L - \log Li$ between the respective light amounts Li stored in the respective channels and said current light amount L of said light source measured at the time of printing;

correcting said density values DNui, DNni, and DNoi of the reference films by using of said differences $\delta i$;

setting said negative film to be printed on said negative carrier and measuring a density value Dx of said negative film under said current light amount L; and substituting said density value Dx of said negative film to be printed and a corresponding one of said corrected density value DNi (i=x) that corresponds to the type of said negative film into a predetermined formula for calculating an exposure condition to thereby calculate an exposure control value.

8. A method of determining an exposure condition as claimed in claim 7, wherein said density values DNi of said reference films, said light amounts Li, and said particular density value Dx of said negative film to be printed are measured for each of three primary colors R (red), G (green), and B (blue).

* * * * *